United States Patent
Zettl et al.

(10) Patent No.: US 9,611,146 B2
(45) Date of Patent: Apr. 4, 2017

(54) CRYSTALLINE BORON NITRIDE AEROGELS

(71) Applicants: LAWRENCE LIVERMORE NATIONAL SECURITY, LLC, Livermore, CA (US); THE REGENTS OF THE UNIVERSITY OF CALIFORNIA, Oakland, CA (US)

(72) Inventors: Alexander K. Zettl, Kensington, CA (US); Michael Rousseas, Burlingame, CA (US); Anna P. Goldstein, Berkeley, CA (US); William Mickelson, Albany, CA (US); Marcus A. Worsley, Hayward, CA (US); Leta Woo, Oakland, CA (US)

(73) Assignees: Lawrence Livermore National Security, LLC, Livermore, CA (US); The Regents of the University of California, Oakland, CA (US)

( * ) Notice: Subject to any disclaimer, the term of this patent is extended or adjusted under 35 U.S.C. 154(b) by 304 days.

(21) Appl. No.: 14/320,300

(22) Filed: Jun. 30, 2014

(65) Prior Publication Data
US 2015/0004087 A1     Jan. 1, 2015

Related U.S. Application Data (60) Provisional application No. 61/841,716, filed on Jul. 1, 2013.

(51) Int. Cl.
*C01B 21/064* (2006.01)
*C04B 35/5831* (2006.01)

(52) U.S. Cl.
CPC ........ *C01B 21/064* (2013.01); *C01B 21/0645* (2013.01); *C04B 35/5831* (2013.01); *C01P 2002/04* (2013.01); *C01P 2002/76* (2013.01); *C01P 2002/78* (2013.01); *C01P 2002/82* (2013.01); *C01P 2004/02* (2013.01); *C01P 2004/03* (2013.01); *C01P 2004/04* (2013.01); *C01P 2004/61* (2013.01); *C01P 2006/10* (2013.01); *C01P 2006/12* (2013.01); *C01P 2006/16* (2013.01); *C01P 2006/60* (2013.01); *C04B 2235/3409* (2013.01);
(Continued)

(58) Field of Classification Search
None
See application file for complete search history.

(56) References Cited

U.S. PATENT DOCUMENTS

| | | | |
|---|---|---|---|
| 8,993,113 B2 | 3/2015 | Pauzauskie et al. | |
| 2013/0202890 A1* | 8/2013 | Kong | H01B 1/02 428/402 |
| 2015/0068974 A1* | 3/2015 | Kong | C09K 3/32 210/502.1 |

OTHER PUBLICATIONS

Paine et al.; Formation and Pore Structure of Boron Nitride Aerogels; J. Am. Ceram. Soc.; 73(3); 757-760; 1990.*
(Continued)

*Primary Examiner* — Guinever S Gregorio
(74) *Attorney, Agent, or Firm* — Foley & Lardner LLP (57) ABSTRACT

This disclosure provides methods and materials related to boron nitride aerogels. In one aspect, a material comprises an aerogel comprising boron nitride. The boron nitride has an ordered crystalline structure. The ordered crystalline structure may include atomic layers of hexagonal boron nitride lying on top of one another, with atoms contained in a first layer being superimposed on atoms contained in a second layer.

20 Claims, 7 Drawing Sheets

(52) U.S. Cl.
CPC .... *C04B 2235/46* (2013.01); *C04B 2235/656* (2013.01); *C04B 2235/761* (2013.01); *C04B 2235/80* (2013.01)

(56) References Cited

OTHER PUBLICATIONS

Narula; Synthetic Routes to Boron Nitride; Chem. Rev.; 90, 73-91; 1990.*
Arenal, R. et al. (2007), "High-Angular-Resolution Electron Energy Loss Spectroscopy of Hexagonal Boron Nitride", Appl. Phys. Lett., 90:204105.
Aydogdu, A. et al. (2003) "Carbothermic Formation of Boron Nitride," J. Eur. Ceram. Soc. 23: 3153-3161.
Bartnitskaya, T.S. et al. (1986) "Structure and Some Properties of Fine-Grained Graphite-like Boron Nitride," J. Less-Common Met. 117: 253-258.
Biener J. et al., (2011) "Advanced Carbon Aerogels for Energy Applications". Energy Environ. Sci., 4: 656-667.
Borek, T. T. et al. (1991) "Highly Microporous Boron Nitride for Gas Adsorption", Langmuir, 7:2844-2846.
Brunauer, S. et al. (1938) "Adsorption of Gases in Multimolecular Layers", J. Am. Chem. Soc., 60:309-319.
Chen, Y. et al. (2004) "Boron Nitride Nanotubes: Pronounced Resistance to Oxidation", Appl. Phys. Lett., 84:2430-2432.
Chyka, P.A. et al. (1997) "Position Statement: Single-Dose Activated Charcoal American Academy of Clinical Toxicology; European Association of Poisons Centres and Clinical Toxicologists," J. Toxicol. Clin. Toxicol., 35:721-741.
Ci, L. et al. (2010) "Atomic Layers of Hybridized Boron Nitride and Graphene Domains," Nat. Mater, 9:430-435.
Cohen, M. et al. (2010) "The Physics of Boron Nitride Nano-tubes", Phys. Today, 63:34-38.
Cullis, C.F. et al. (1964) "Reaction of Carbon with Nitrogen", Trans. Faraday Soc., 60:141-148.
Dean, C. R. et al. (2010) "Boron Nitride Substrates for High-Quality Graphene Electronics", Nat. Nanotechnol., 5:722-726.
Dibandjo, P. et al. (2007), "Thermal Stability of Mesoporous Boron Nitride Templated with a Cationic Surfactant", J. Eur. Ceram. Soc., 27:313-317.
Dresselhaus, M.S. et al. (2004), "Electronic, Thermal and Mechanical Properties of Carbon Nanotubes", Philos. Trans. R. Soc., 362:2065-2098.
Frackowiak, E. et al. (2001) "Carbon Materials for the Electrochemical Storage of Energy in Capacitors" Carbon, 39:937-950.
Friederich, E. et al. (1925) "Und Eigenschaften von Nitriden", J. Inorg. Gen. Chem., 143:293-320.
Geim, A.K. et al. (2013) "Heterostructures", Nature, 499:419-425.
Golberg, D. et al. (2000), "MoO3-Promoted Synthesis of Multi-Walled BN Nanotubes from C Nanotube Templates", Chem. Phys. Lett., 323:185-191.
Gorbachev, R.V. et al. (2011) "Hunting for Monolayer Boron Nitride: Optical and Raman Signatures," Small, 7:465-468.
Han, W. et al. (1998) "Synthesis of Boron Nitride Nanotubes from Carbon Nanotubes by a Substitution Reaction," Appl. Phys. Lett., 73:3085-3087.
Han, W.-Q. et al. (2004) "Activated Boron Nitride Derived from Activated Carbon," Nano Lett. 4:173-176.
Han, W.-Q. et al. (2011) "Convert Graphene Sheets to Boron Nitride and Boron Nitride—Carbon Sheets via a Carbon-Substitution Reaction," Appl. Phys. Lett., 98:203112.
Han, W.-Q. et al. (2002) "Transformation of $B_xC_yN_z$ Nanotubes to Pure BN Nanotubes," Appl. Phys. Lett., 81:1110-1112.
Hubácek, M. et al. (1996) "Chemical Reactions in Hexagonal Boron Nitride System,". J. Solid State Chem., 123:215-222.
Ikuno, T. et al. (2007) "Amine-Functionalized Boron Nitride Nanotubes," Solid State Commun. 142: 643-646.
Janik, J. F. et al. (1994) "Boron Nitride as a Selective Gas Adsorbent," Langmuir, 10:514-518.

Jhi, S.-H. et al. (2004) "Hydrogen Adsorption on Boron Nitride Nanotubes: A Path to Room-Temperature Hydrogen Storage," Phys. Rev. B, 69:245407.
Jung, S.M. et al. (2012) "A Facile Route for 3D Aerogels from Nanostructured 1D and 2D Materials," Sci. Rep., 2:849.
Kim, J. et al. (2013) "High-Surface Area Ceramic-Derived Boron-Nitride and its Hydrogen Uptake Properties," J. Mater. Chem. A, 1:1014-1017.
Kim, K. et al. (2011) "A. Multiply Folded Graphene," Phys. Rev. B, 83: 245433.
Lee, J. et al. (2006) "Recent Progress in the Synthesis of Porous Carbon Material", Adv. Mater. 18:2073-2094.
Lei, W. et al. (2013) "Porous Boron Nitride Nanosheets for Effective Water Cleaning,". Nat. Commun., 4:1777.
Li, J. et al. (2013) "Porous Boron Nitride with a High Surface Area: Hydrogen Storage and Water Treatment," Nanotechnology, 24:155603.
Li, C. et al. (2009) "Thickness-Dependent Bending Modulus of Hexagonal Boron Nitride Nanosheets," Nanotechnology, 20:385707.
Lin, Y. et al. (2010) "Defect Functionalization of Hexagonal Boron Nitride Nanosheets,"J. Phys. Chem. C, 114:17434-17439.
Lindquist, D. A. et al. (1990) "Formation and Pore Structure of Boron Nitride Aerogels," J. Am. Ceram. Soc., 73:757-760.
Ma, R. et al. (2002) "Hydrogen Uptake in Boron Nitride Nanotubes at Room Temperature," J. Am. Chem. Soc., 124:7672-7673.
Moreno-Castilla, C. et al. (2005), "Carbon Aerogels for Catalysis Applications: An Overview," Carbon 43:455-465.
Nemanich, R. J. et al. (1981) "Light Scattering Study of Boron Nitride Microcrystals," Phys. Rev. B, 23:6348-6356.
Ortolani, L. et al. (2012) "Folded Graphene Membranes: Mapping Curvature at the Nanoscale," Nano Lett., 12:5207-5212.
Paine, R. T. (1992) "Processing of Boron-Nitrogen Preceramic Polymers," J. Inorg. Organomet. Polym., 2:183-195.
Paine, R.T. (1990) "Synthetic Routes to Boron Nitride," Chem. Rev., 90:73-91.
Qu, D. et al. (1998) "Studies of Activated Carbons Used in Double-Layer Capacitors," J. Power Sources, 74:99-107.
Robertson, J. (1984) "Electronic Structure and Core Exciton of Hexagonal Boron Nitride," Phys. Rev. B, 29:2131-2137.
Rousseas, M. et al. (2013), "Synthesis of Highly Crystalline $sp^2$-Bonded Boron Nitride Aerogels", American Chemistry Society, 7(10):8540-8546.
Sainsbury, T. et al. (2007) "Self Assembly of Gold Nanoparticles at the Surface of Amine—and Thiol—Functionalized Boron Nitride Nanotubes," J. Phys. Chem. C, 111:12992-12999.
Schlienger, S. et al. (2012) "Micro-, Mesoporous Boron Nitride-Based Materials Templated from Zeolites," Chem. Mater., 24:88-96.
Song, L. et al. (2010) "Large Scale Growth and Characterization of Atomic Hexagonal Boron Nitride Layers," Nano Lett., 10:3209-3215.
Weng, Q. et al. (2013) "Boron Nitride Porous Microbelts for Hydrogen Storage," ACS Nano, 7: 1558-1565.
Worsley, M. A et al. (2010) "Synthesis of Graphene Aerogel with High Electrical Conductivity," J. Am. Chem. Soc., 132:14067-14069.
Worsley, M. A. et al. (2011) "High Surface Area, $sp^2$-Cross-Linked Three-Dimensional Graphene Monoliths," J. Phys. Chem. Lett., 2, 921-925.
Worsley, M. A. et al. (2012) "Mechanically Robust 3D Graphene Macroassembly with High Surface Area," Chem. Commun., 48:8428-8430.
Yin, C.Y. et al. (2007) "Review of Modifications of Activated Carbon for Enhancing Contaminant Uptakes from Aqueous Solutions", Purif. Technol., 52:403-415.
Yin, J. et al. (2013) "Ultralight Three-Dimensional Boron Nitride Foam with Ultralow Permittivity and Super-elasticity," Nano Lett., 13:3232-3236.
Yoon, S. J. et al. (1996) "Vapour-Phase Reduction and the Synthesis of Boron-Based Ceramic Phases. Part II: The Synthesis of Hexagonal Boron Nitride Phase," J. Mater. Sci., 31:2265-2277.

(56) References Cited

OTHER PUBLICATIONS

Zhi, C. et al. (2009) "Towards Thermoconductive, Electrically Insulating Polymeric Composites with Boron Nitride Nanotubes as Fillers," Adv. Funct. Mater, 19:1857-1862.

* cited by examiner

CRYSTALLINE BORON NITRIDE AEROGELS

CROSS REFERENCE TO RELATED APPLICATIONS

This application claims priority from U.S. Provisional Application No. 61/841,716, filed Jul. 1, 2013, which is herein incorporated by reference in its entirety.

STATEMENT OF GOVERNMENT SUPPORT

This invention was made with government support under Contract No. DE-AC02-05CH11231 awarded by the U.S. Department of Energy, under Contract No. DE-AC52-07NA27344 awarded by the U.S. Department of Energy, and under Grant X10-8049-C awarded by the Air Force Office of Scientific Research. The government has certain rights in this invention.

BACKGROUND

Boron nitride (BN) forms bonding configurations similar to carbon. While sharing many of the same robust mechanical and thermal properties of graphite (Cohen et al., *Phys. Today*, 2010, 63:34-38; Dresselhaus et al., *Philos. Trans. R. Soc.*, 2004, 362:2065-2098), the polar nature of the boron-nitrogen bond in planar (i.e., hexagonal) BN makes BN an optically transparent insulator (Robertson et al., *Phys. Rev. B*, 1984, 29:2131-2137), with different chemistry on the surface of the hexagonal lattice. As a consequence, BN-based materials are more resistant to oxidation than graphene-based materials (Chen et al., *Appl. Phys. Lett.*, 2004, 84:2430-2432). BN also has enhanced physisorption properties due to the dipolar fields near its surface (Jhi et al., *Phys. Rev. B*, 2004, 69:245407). BN has been shown to surpass carbon in its ability to store gases such as hydrogen (Borek et al., *Langmuir*, 1991, 7:2844-2846; Li et al., *Nanotechnology*, 2013, 24:155603; Ma et al., *J. Am. Chem. Soc.*, 2002, 124:7672-7673; Kim et al., *J. Mater. Chem. A*, 2013, 1:1014-1017; Weng et al., *ACS Nano*, 2013, 7:1558-1565; Janik et al., *Langmuir*, 1994, 10:514-518), and is a very effective and reusable cleanup agent for hydrocarbons (Lei et al., *Nat. Commun.*, 2013, 4:1777). Also, despite its relative chemical inertness, BN surfaces can be functionalized (Ikuno et al., *Solid State Commun.*, 2007, 142:643-646; Lin et al., *J. Phys. Chem. C*, 2010, 114:17434-17439), allowing for their incorporation into composites (Zhi et al., *Adv. Funct. Mater.*, 2009, 19:1857-1862), as well as their use as scaffolds for nanoparticles in catalysis and other applications (Sainsbury et al., *J. Phys. Chem. C*, 2007, 111:12992-12999).

Previous synthetic routes for BN-type aerogels and related meso-scale assemblies have included templated growth from existing porous structures such as zeolites (Schlienger et al., *Chem. Mater.*, 2012, 24:88-96), gelation of colloidal BN suspensions (Jung et al., *Sci. Rep.*, 2012, 2:849), and various high temperature reactions of boron and nitrogen containing compounds (Dibandjo et al., *J. Eur. Ceram. Soc.*, 2007, 27:313-317; Paine et al., *J. Inorg. Organomet. Polym.*, 1992, 2:183-195.). Despite a number of promising fields of application, research in this area has been slow due to the often toxic and volatile precursors involved and the limited synthetic routes to high quality BN. Furthermore, these synthesis methods have generally resulted in compounds of mixed BN phases and disordered or turbostratic stacking of planar sheets, corresponding to a crystal structure found in materials where atomic planes are inclined and rotated randomly with respect to one another.

Thus, a need exists for BN-based materials with improved structural quality.

SUMMARY

One aspect of the invention described herein relates to an aerogel material comprising boron nitride, the boron nitride having an ordered crystalline structure.

In some embodiments, the ordered crystalline structure includes atomic layers of hexagonal boron nitride laying on top of one another, and wherein atoms contained in a first layer are superimposed on atoms contained in a second layer.

In some embodiments, atomic planes of the boron nitride have an interplanar distance of about 3.3 Angstroms.

In some embodiments, the boron nitride described herein has a degree of crystallinity of at least 30%, or a degree of crystallinity of at least 40%, or a degree of crystallinity of at least 50%, or a degree of crystallinity of at least 70%, either by weight or by volume. In some embodiments, the boron nitride described herein does not have a substantially disordered crystalline structure.

In some embodiments, the aerogel described herein comprises sheets of boron nitride that are covalently bonded to one another. In some embodiments, at least 30% of the boron nitride sheets, or at least 40% of the boron nitride sheets, or at least 50% of the boron nitride sheets, or at least 70% of the boron nitride sheets, are covalently crosslinked with one another. In some embodiments, the aerogel consists essentially of sheets of boron nitride that are covalently bonded to one another.

In some embodiments, less than 50%, or less than 40%, or less than 30%, or less than 10% of the boron nitride sheets are associated with other boron nitride sheets by van der Waals force only. In some embodiments, the aerogel is substantially free of boron nitride sheets that are associated with other boron nitride sheets by van der Waals force only.

In some embodiments, the aerogel described herein comprises a three-dimensional network of $sp^2$-bonded boron nitride. In some embodiments, at least 50% of the boron nitride, or at least 70% of the boron nitride, or at least 90% of the boron nitride, or at least 95% of the boron nitride, are $sp^2$-bonded boron nitride.

In some embodiments, the aerogel described herein comprises at least about 70 atomic percent boron nitride, or at least about 80 atomic percent boron nitride, or at least about 90 atomic percent boron nitride, or at least about 95 atomic percent boron nitride. In some embodiments, the aerogel described herein consists essentially of boron nitride.

In some embodiments, the aerogel described herein comprises less than 10 atomic percent carbon, or less than 5 atomic percent carbon, or less than 2 atomic percent carbon, or less than 1 atomic percent carbon.

In some embodiments, the aerogel described herein has a surface area of about 350 meters squared per gram to 3000 meters squared per gram, or a surface area of about 350 meters squared per gram to 1050 meters squared per gram, or a surface area of about 1500 meters squared per gram to 3000 meters squared per gram.

In some embodiments, the boron nitride comprises hexagonal boron nitride.

In some embodiments, the aerogel comprises sheets of boron nitride, wherein the sheets of boron nitride include about 5 atomic layers of boron nitride or less. In some embodiments, the aerogel comprises sheets of boron nitride, wherein the sheets of boron nitride include an average of about 6-8 atomic layers of boron nitride.

In some embodiments, the aerogel comprises sheets of boron nitride, wherein at least a portion of the sheets of boron nitride form slit-shaped pore structures about 400 nanometers to 600 nanometers wide and about 2 microns to 4 microns long.

In some embodiments, the boron nitride has a white color.

In some embodiments, the aerogel has a mass density of about 50 milligrams per cubic centimeter to 150 milligrams per cubic centimeter.

In some embodiments, the aerogel comprises sheets of boron nitride, wherein the sheets of boron nitride have planar surfaces having dimensions of about 10 microns to 50 microns by about 10 microns to 50 microns.

In some embodiments, pores of the aerogel have diameters of about 2 nanometers to 50 nanometers.

Another aspect of the present invention described herein relates a method for making the aerogel material described herein, comprising: (a) providing boron oxide and an aerogel comprising carbon; (b) heating the boron oxide to melt the boron oxide and heating the aerogel; (c) mixing a nitrogen-containing gas with boron oxide vapor from molten boron oxide; and (d) converting at least a portion of the carbon of the aerogel to boron nitride.

In some embodiments, the aerogel comprising carbon in (a) includes graphitic carbon. In some embodiments, the aerogel comprising carbon in (a) is a graphene aerogel. In some embodiments, at least 50%, or at least 70%, or at least 90% of the graphene sheets are chemically crosslinked to other graphene sheets by covalent bonds. In some embodiments, less than 50%, or less than 30%, or less than 20%, or less than 10% of the graphene sheets are physically associated with other graphene sheets by van der Waals force only.

In some embodiments, at least about 70 atomic percent of the carbon, or at least about 80 atomic percent of the carbon, or at least about 90 atomic percent of the carbon, or at least about 95 atomic percent of the carbon is converted to boron nitride in (d).

In some embodiments, the method is substantially free of the use of additional promoters such as metal oxides for converting carbon to boron nitride. In some embodiments, the method does not comprise a step of burning off residual carbon.

The ordered crystalline structure described herein can comprise, for example, perfectly order crystalline structure as well as crystalline structure that differ slightly from perfectly order crystalline structure, such as where atoms in a first layer are displaced relative to atoms in a second layer by no more than 4 Angstroms, or no more than 3 Angstroms, or no more than 2.5 Angstroms, or no more than 2 Angstroms.

These and other features, together with the organization and manner of operation thereof, will become apparent from the following detailed description when taken in conjunction with the accompanying drawings.

BRIEF DESCRIPTION OF THE DRAWINGS

Note that the relative dimensions of the following figures may not be drawn to scale.

FIG. 7 shows (a) Example electron energy loss spectrum taken from a converted BN aerogel. The strong peak near 200 eV is attributed to boron, with edge features consistent with $sp^2$-bonded BN; the peak near 400 eV is attributed to nitrogen. Noticeably absent is any distinguishable feature near 290 eV which would indicate the presence of carbon. The calculated ratio of boron to nitrogen is nearly 1:1, and the carbon concentration is below the resolution of the spectrometer (<5%). (b) Example Raman spectrum of the BN aerogel (solid line) and the graphene-based precursor (dotted line). The graphene aerogel spectrum shows broad peaks for the D and G bands in graphene, as observed in previous reports of graphene aerogel synthesis. The BN spectrum shows a single sharp peak at 1366 $cm^{-1}$, indicating that the BN aerogels have highly crystalline $sp^2$ bonding.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

An aerogel is typically defined as a porous, monolithic, solid material comprised of cross-linked elements or constituents, whose pores are filled with air or some other gas.

Aerogels typically have extremely low densities (e.g., about 0.0011 grams per cubic centimeter (g/cm$^3$) to 0.5 g/cm$^3$, or about 0.2 g/cm$^3$) and high specific surface areas (e.g., about 100 meters squared per gram (m$^2$/g) to 3000 m$^2$/g). An aerogel is typically open-porous (i.e., the gas in the aerogel is not trapped inside solid pockets) and may have pores or slits about 1 nanometer (nm) wide to 1 micron wide.

Disclosed herein are synthesis methods and the characterization of high specific surface area (SSA), low density BN aerogels that in some embodiments are comprised locally of few atomic-layer sheets of hexagonal BN. In some embodiments, the BN aerogels show a high degree of crystalline order and chemical purity. In some embodiments, the synthesis methods use only common, non-hazardous reactants. In some embodiments, carbon nanostructures can be substantially or completely converted to BN while maintaining their macro and meso-scale morphologies.

In some embodiments, BN aerogel synthesis methods are based on the carbothermal reduction of graphene aerogels to BN aerogels having a similar structure as the graphene aerogels. The graphene aerogels, with a typical mass density of about 60 mg/cm$^3$ to 150 mg/cm$^3$, may be prepared using a number of different methods. In some embodiments, the graphene aerogels are placed together with boron oxide powder in a graphite crucible and heated in an induction furnace under nitrogen flow. At sufficiently high temperatures, the graphene sheets of the starting aerogel may be converted to hexagonal (hBN) nominally according to the following reaction:

$$B_2O_3 + 3C + N_2 \rightarrow 2BN + 3CO \qquad (1)$$

The boron oxide is believed to react purely in the vapor phase, and BN is found to be the only solid product at temperatures above about 1500° C. in some embodiments. In practice, the operating temperature for this reaction is in the range of about 1600° C. to 1800° C. in order to provide sufficient vapor pressure of boron oxide. In some embodiments, contact between the aerogel and liquid boron oxide is avoided, so as to prevent any potential damage to the pore structure from capillary forces. The carbon and BN here are in their hexagonal phases; as such, reaction (1) represents an in-situ reforming of the sp$^2$ bonded layers of the starting material.

Figure 1:
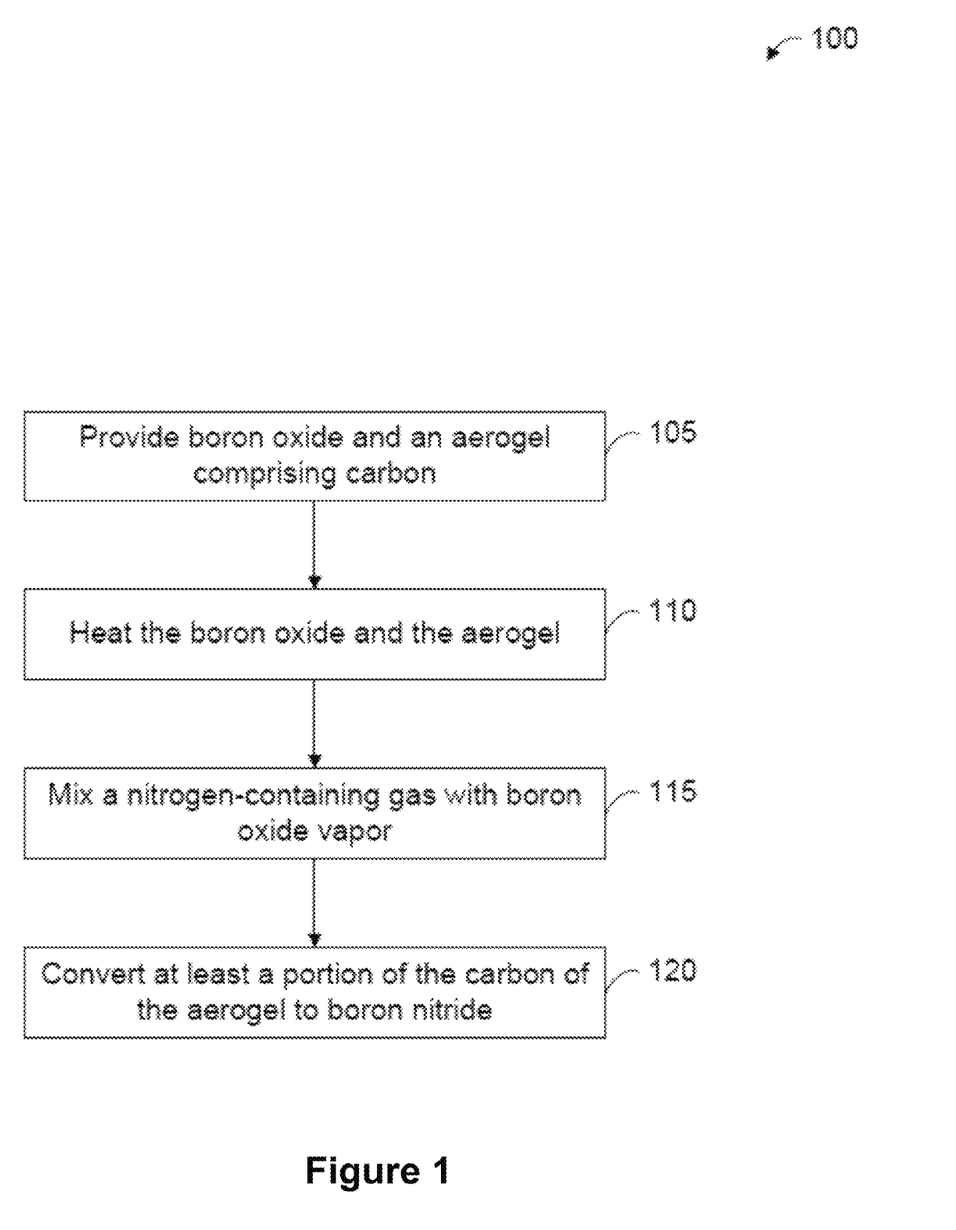
FIG. 1 shows an example of a method for synthesizing an aerogel comprising boron nitride.

FIG. 1 shows an example of a method for synthesizing an aerogel comprising boron nitride. In operation 105 of a method 100, boron oxide and an aerogel comprising carbon are provided. In some embodiments, the boron oxide and the aerogel comprising carbon are placed in a graphite crucible (e.g., about 10 grams of boron oxide in an about 2" diameter by about 4" tall cylindrical graphite crucible). In some embodiments, the aerogel is supported in the middle of the crucible by a graphite cup with holes drilled in the bottom to allow for flow of reactant gases.

The aerogel comprising carbon may be fabricated using many different techniques. For example, in some embodiments, graphene oxide powder (e.g., about 0.2 grams) is mixed with deionized water (e.g., about 16.7 mL) in a glass vial and sonicated to reach a smooth liquid consistency. Ammonium hydroxide (e.g., about 3.3 milliliters, about 28 weight percent solution) is added and mixed well. The vial is sealed and heated to about 85° C. for about 40 hours, which produces a monolithic hydrogel. The gel is then soaked sequentially in deionized water and high purity isopropanol alcohol. Solvent is removed by supercritical CO$_2$ drying in a critical point dryer. The aerogels are then graphitized via firing for about 3 hours at about 1100° C. under an argon gas flow. Further details regarding this process for fabricating a carbon aerogel can be found in U.S. patent application Ser. No. 13/204,277 and in the publication Worsley, M.; Pauzauskie, P.; Olson, T.; Biener, J.; Satcher, J.; Baumann, T. Synthesis of graphene aerogel with high electrical conductivity. J. Am. Chem. Soc. 2010, 132, 14067-14069, both of which are herein incorporated by reference in their entireties.

In operation 110, the boron oxide is heated to melt the boron oxide and the aerogel is heated. For example, a crucible containing the boron oxide and the aerogel may be heated to melt and evaporate the boron oxide, and to heat the aerogel and any gases contained in the crucible. In some embodiments, the boron oxide and the aerogel are heated with a radio frequency induction furnace. In some embodiments, the boron oxide and the aerogel are heated to about 1600° C. to 1800° C.

In operation 115, a nitrogen-containing gas is mixed with boron oxide vapor from molten boron oxide. In some embodiments, the nitrogen-containing gas comprises nitrogen. In some embodiments, the flow rate of the nitrogen-containing gas is about 1000 standard cubic centimeters per minute (sccm) to 2000 sccm, or about 1500 sccm. In some embodiments, the nitrogen-containing gas is introduced through a central tube of a cylindrical graphite crucible, which may aid in transporting boron oxide vapor upward towards the aerogel.

In operation 120, at least a portion of the carbon of the aerogel is converted to boron nitride. In some embodiments, the conversion may be performed in about 30 minutes or less at a temperature greater than about 1600° C.; performing operation 120 in about 30 minutes or less may preserve the nanostructure of the aerogel during the conversion process. At 1600° C. to 1800° C. and using nitrogen as the nitrogen-containing gas at a flow rate of 1500 sccm, the evaporation rate of boron oxide is about 500 mg per minute. Further details regarding the method 100 may be found in U.S. Provisional Patent Application No. 61/751,641, which is herein incorporated by reference in its entirety.

After performing the method 100, the aerogel comprises boron nitride. In some embodiments, the boron nitride has a substantially ordered crystalline structure. In some embodiments, the aerogel comprises at least about 95 atomic percent boron nitride. In some embodiments, the ordered crystalline structure includes atomic layers of hexagonal boron nitride lying on top of one another, with atoms contained in a first layer being superimposed on atoms contained in a second layer. For example, the atomic layers of hexagonal boron nitride may be stacked such that boron atoms of a first layer overlay nitrogen atoms of a second layer, and the nitrogen atoms of the first layer overlay boron atoms of the second layer. In some embodiments, the boron nitride comprises hexagonal boron nitride. In some embodiments, the boron nitride has a white color. In some embodiments, atomic planes of the boron nitride have an interplanar distance of about 3.3 Angstroms.

In some embodiments, the boron nitride does not have a substantially turbostratic crystalline structure (i.e., a type of crystal structure found in materials where atomic planes, such as those in graphite or BN, are inclined and rotated randomly with respect to one another). In some embodiments, the boron nitride does not have a substantially disordered crystalline structure.

In some embodiments, the aerogel comprises sheets of boron nitride that are covalently bonded to one another. In some embodiments, there is overlap between the sheets of boron nitride of the aerogel, which may increase the mechanical stability of the aerogel while maintaining a high specific surface area. In some embodiments, atomic planes of BN may be shared between neighboring sheets of BN, which may further increase the mechanical stability of the aerogel. When forming an aerogel comprising boron nitride using other processing techniques, and not the carbothermal reduction technique described herein, the aerogel may include small particles of boron nitride (e.g., typically boron nitride crystallites tens of atomic layers thick) that are weakly bound together with little or no overlap (i.e., few of no particles sharing an atomic plane of boron nitride) or covalent bonding between the particles of the aerogel.

In some embodiments, the aerogel comprises sheets of boron nitride, with the sheets of boron nitride including about 5 atomic layers of boron nitride or less. In some embodiments, the aerogel comprises sheets of boron nitride, with the sheets of boron nitride including an average of about 6 atomic layers of boron nitride. In some embodiments, the aerogel comprises crumpled sheets of boron nitride, with the sheets of boron nitride having a thickness and dimensions of about 10 microns to 50 microns by about 10 microns to 50 microns.

In some embodiments, the aerogel comprises sheets of boron nitride, with at least a portion of the sheets of boron nitride forming slit-shaped pore structures about 400 nanometers to 600 nanometers wide and about 2 microns to 4 microns long. In some embodiments, the aerogel comprises sheets of boron nitride, with at least a portion of the sheets of boron nitride forming slit-shaped pore structures about 500 nanometers wide and about 3 microns long.

In some embodiments, the aerogel has a specific surface area of about 350 meters squared per gram ($m^2/g$) to 3000 $m^2/g$. In some embodiments, the aerogel has a specific surface area of about 350 $m^2/g$ to 1050 $m^2/g$. In some embodiments, the aerogel has a specific surface area of about 700 $m^2/g$. In some embodiments, the aerogel has a specific surface area of about 1500 $m^2/g$ to 3000 $m^2/g$. In some embodiments, the aerogel has a mass density of about 50 milligrams per cubic centimeter ($mg/cm^3$) to 150 $mg/cm^3$. In some embodiments, the aerogel has a mass density of about 100 $mg/cm^3$. In some embodiments, pores of the aerogel have a diameter of about 2 nanometers to 50 nanometers.

Potential applications of boron nitride aerogels include water purification, gas storage (including hydrogen and $CO_2$), oil recovery from oil spills, catalyst support, gas sensor, biosensor, fuel cell membranes, batteries, filters, poison control, and supercapacitors.

These and other features, together with the organization and manner of operation thereof, will become apparent from the following detailed description when taken in conjunction with the accompanying drawings.

WORKING EXAMPLES

The following description of the characterization of a BN aerogel synthesized using methods disclosed herein and of the reactions associated with BN aerogel synthesis methods are intended to be examples of the embodiments disclosed herein, and are not intended to be limiting.

EXAMPLE 1

METHODS

Synthesis of Graphene Aerogels. Graphene oxide powder (Cheap Tubes Inc., 0.2 g) was mixed with deionized water (16.7 mL) in a 20 mL glass vial and sonicated to reach a smooth liquid consistency. Ammonium hydroxide (3.3 mL, 28 wt % solution) was added and mixed well. The vial was sealed and heated at 85° C. for 40 h, resulting in a monolithic hydrogel. The gel was then soaked sequentially in deionized water and high-purity isopropyl alcohol. Solvent was removed by supercritical $CO_2$ drying. The aerogels were then graphitized via firing for 3 h at 1100° C. under argon flow.

Conversion of Graphene Aerogels. The conversion occurred in a 5 cm diameter by 10 cm tall cylindrical graphite crucible. The aerogels were supported in the middle of the crucible by a graphite cup with holes drilled in the bottom to allow for proper flow of the reactant gases. About 10 g of boron oxide powder (Alfa Aesar A11707) was placed at the bottom of the crucible, which was then heated under nitrogen flow (1500 sccm) in a radio frequency induction furnace to between 1600° C. and 1800° C. The powder was premelt to eliminate adsorbed water to prevent overbubbling and damaging the sample. Nitrogen was introduced through a central tube which in turn mixed well with the boron oxide vapor and helped to carry it upward toward the aerogels. The conversion was run long enough to allow for all of the boron oxide to evaporate; under these conditions, the evaporation rate of boron oxide was between 200 and 500 mg/min.

Determination of Interlayer Spacing. Starting from a high-resolution TEM image, the grayscale values of the pixels along a line transecting the given fringes were plotted. For two to three fringes, the resulting curve was fitted to a set of Gaussians using a Levenberg-Marquardt algorithm. For four or more fringes, a discrete Fourier transform was taken using a fast Fourier transform (FFT) algorithm. The resulting spectrum displayed a distinct Fourier peak superimposed on a 1/f background. The quoted values and precision for interplanar spacing corresponded to the center and width of the peak, respectively.

Characterization. TEM images were collected on a JEOL JEM2010 microscope operating at 80 kV. Samples were prepared by suspending the materials in isopropyl alcohol via ultra-sonication and then drop-casting onto holey carbon grids; alternately, the grids were simply rubbed gently against a cleaved surface of the gel. EELS was performed using a Phillips CM200 TEM operating at 200 kV and equipped with a Gatan imaging filter. Raman spectra were collected on a Renishaw in Via spectrometer using a 633 nm excitation laser. Nitrogen adsorption isotherms were measured using a Micromeritics ASAP 2010 porosimeter. XRD was performed using a Bruker D8 Advance X-ray diffractometer using Cu Kα radiation.

EXAMPLE 2

RESULTS

Figure 2:
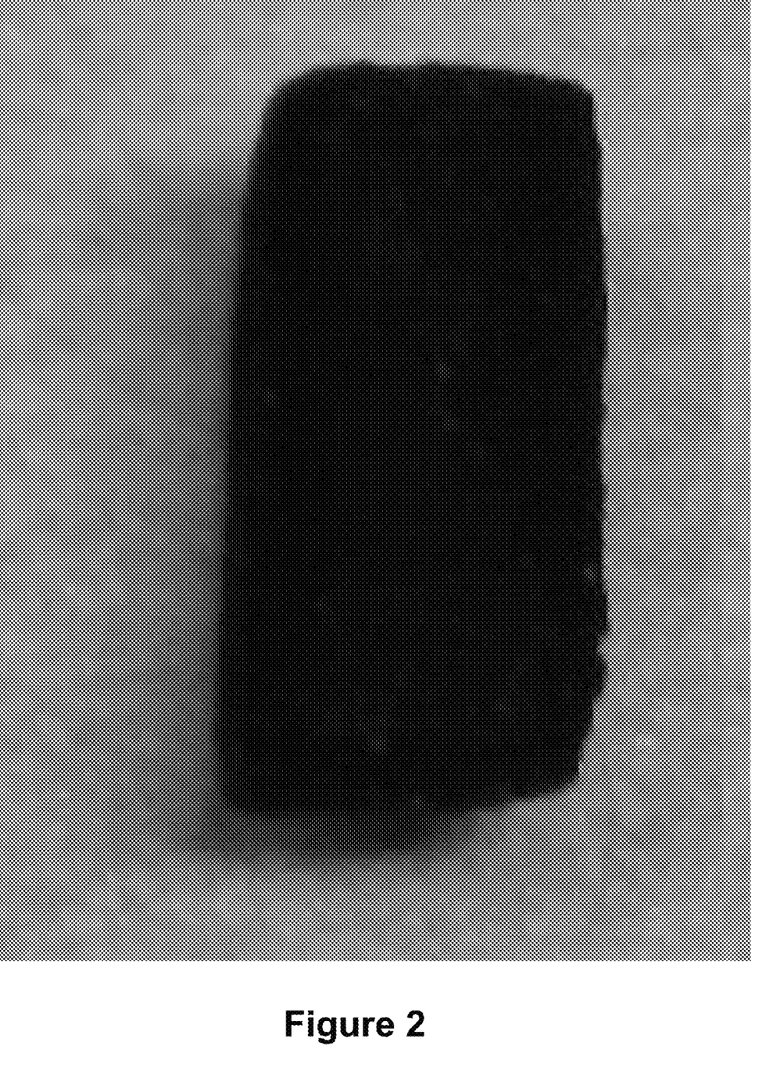
FIG. 2 shows an example of a photograph of a graphene aerogel.
Figure 3:
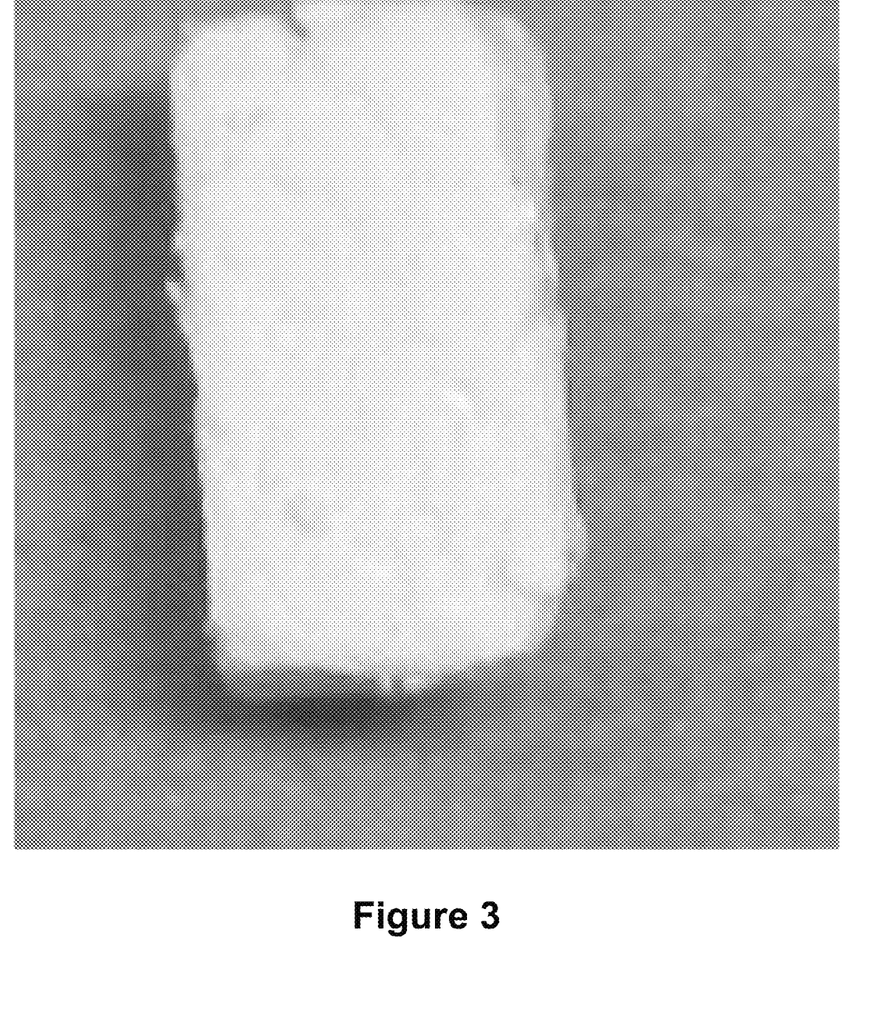
FIG. 3 shows an example of a photograph the graphene aerogel after conversion to a BN aerogel.

FIG. 2 shows an example of a photograph of a graphene aerogel. FIG. 3 shows an example of a photograph the graphene aerogel after conversion to a BN aerogel. The BN aerogel substantially maintained its original size and macroscopic shape. There was, however, a dramatic change in color from black to white, which was uniform throughout the cross-section of the sample. There was a small degree of mass loss due to the boron nitride conversion process (i.e., about 10%), which is consistent with other studies of carbothermal reduction of boron nitride.

Figure 4:
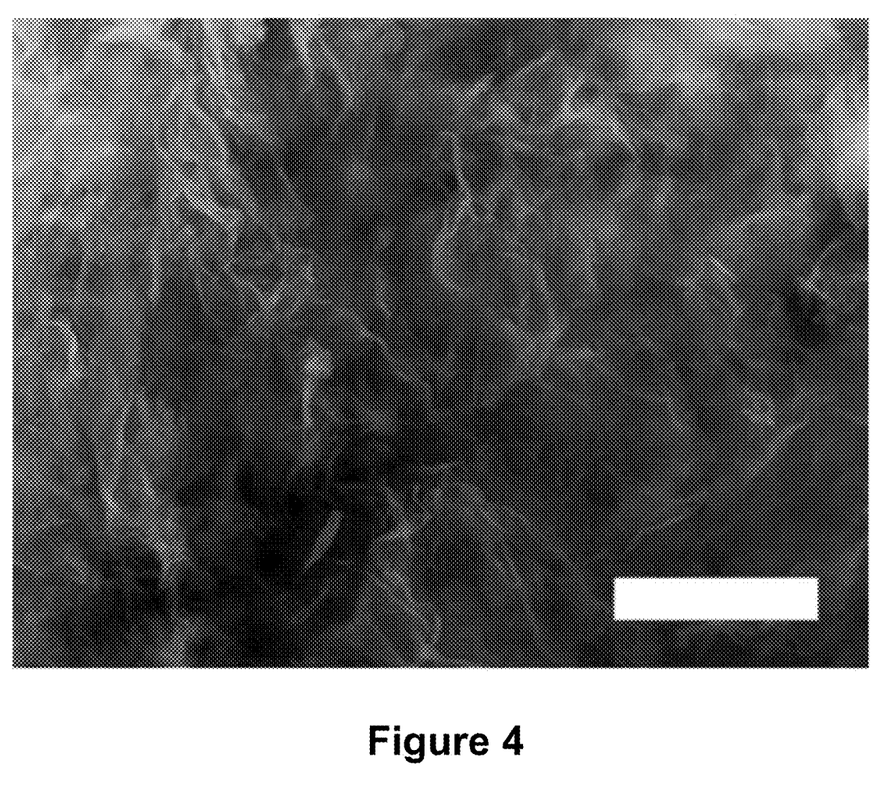
FIG. 4 shows an example SEM image of a BN aerogel. The structure is composed of many ultrathin, wrinkled sheets several micrometers long and folded into each other, forming slit-shaped macropores. Scale bar is 5 μm.

Scanning electron microscopy showed that the mesoscale BN aerogel had a foliated architecture very similar to that of the starting graphene aerogel, as shown in FIG. 4. Thin sheets several tens of microns on a side were found crumpled together, forming slit-shaped pore structures around 500 nanometer (nm) wide and several microns long. These structures were stable, despite being atomically thin, owing to the relatively high stiffness of few-layer BN sheets. Graphene and BN are unique in forming such structures; the mechanical properties of the sheets, coupled with the low atomic numbers of their constituent atoms, allows for the fabrication of crystalline, high SSA materials.

Figure 5:
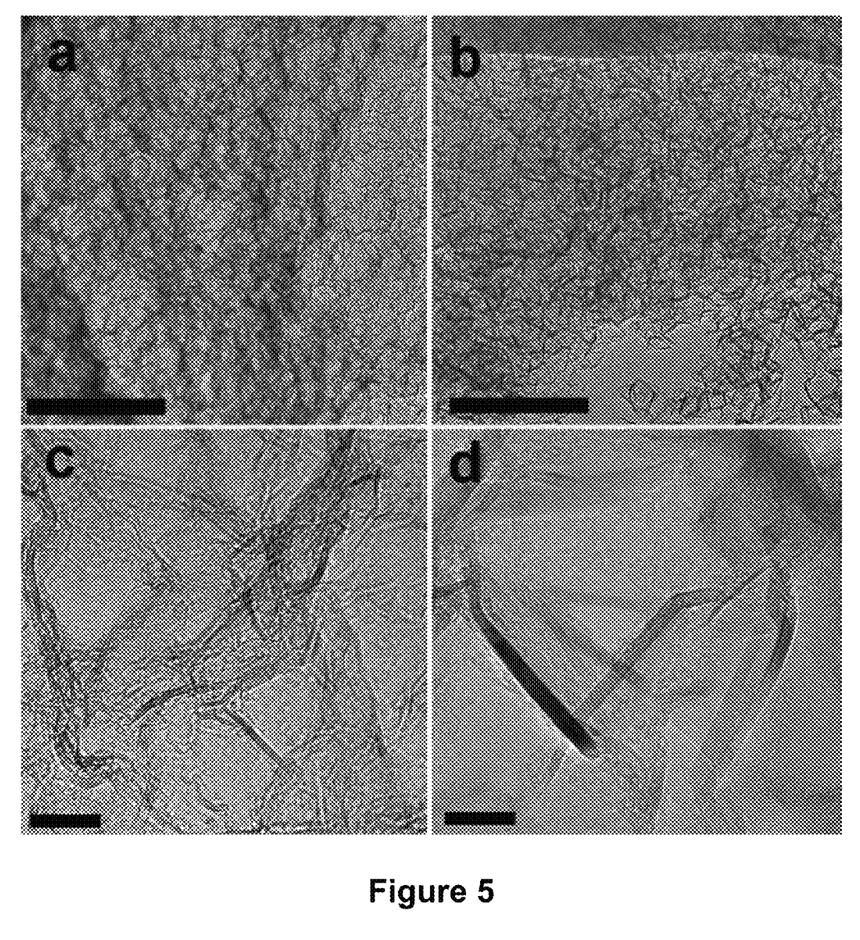
FIG. 5 shows example TEM images of original graphene aerogel (a, c) and converted BN aerogel (b, d). The lower-magnification TEM images (a, b) show that both aerogels are porous with feature sizes of about 30 nm. The higher-magnification TEM images (c, d) show that the aerogels comprise layered structures, indicated by the parallel, dark fringes. Upon conversion to BN, the layered structures become more crystalline with sharp transitions between the facets (d), compared to the more meandering layers observed in the graphene aerogels (c). In addition, the average number of wall for the constituent sheets increases from 2 to 3 in the case of the graphene gels to 6 to 8 for the BN gels. Scale bars are 200 nm (a, c) and 10 nm (c, d).

Transmission electron microscopy of graphene aerogels (FIG. 5a, 5c) and converted boron nitride aerogels (FIG. 5b, 5d) showed that the morphology on the 100 nm scale was not significantly altered upon conversion to BN. In both the graphene and the BN aerogels, the material was composed of wrinkled sheets with facets on the order of hundreds of nm$^2$ and several atomic layers thick. However, differences were apparent at higher magnifications (FIG. 5c, 5d). The intrinsic "sheets" of converted BN, while retaining roughly the same size and shape, were approximately twice as thick as those of the original graphene aerogel, increasing from 3 to 6 atomic layers on average. These thicker BN sheets were straighter and more ordered than those of the graphene aerogel; e.g., in some cases, atomically straight edges 40 nm and longer were observed, whereas such features were at most 10 nm in the graphene aerogel precursor.

Figure 6:
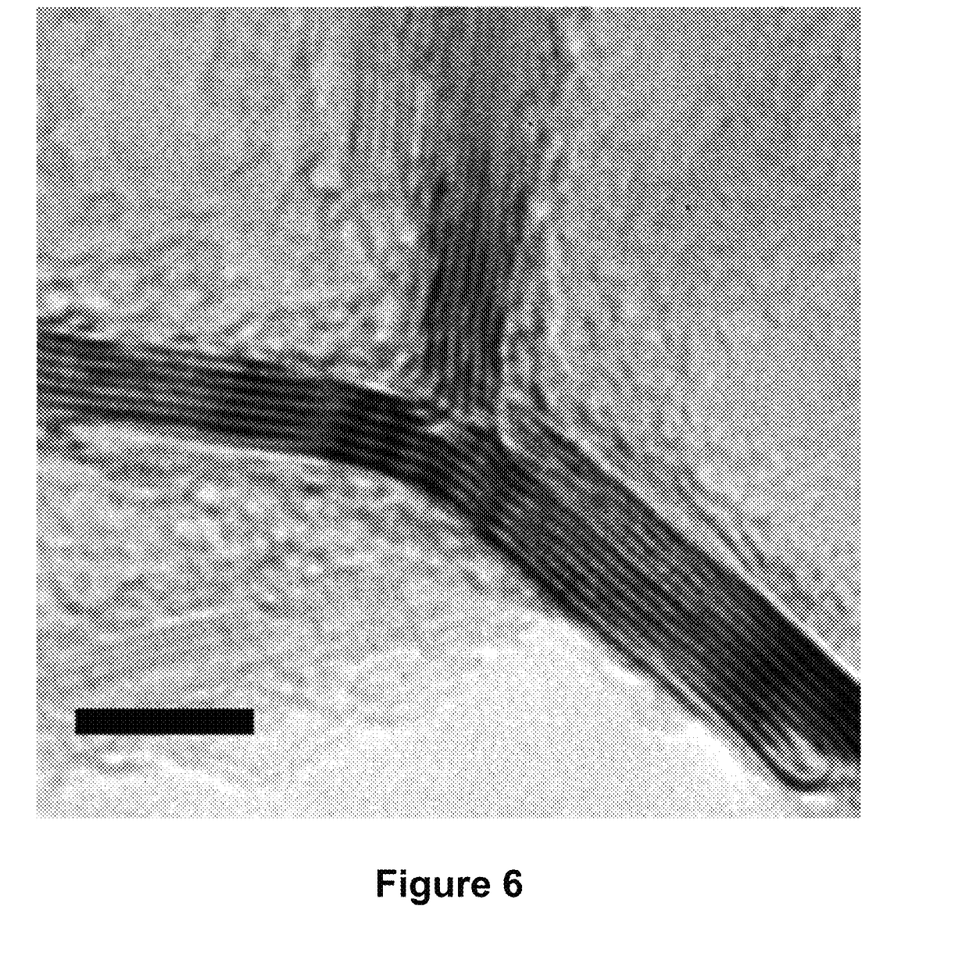
FIG. 6 shows an example high-resolution TEM image of a cross-link in a BN aerogel. The atomic layers of BN extend uninterrupted from all three aerogel sheets, showing that these extended structures are held together by covalent $sp^2$ bonds. Similar structures of varying geometries are found throughout the BN aerogel samples. Scale bar is 5 nm.

FIG. 6 shows a high-magnification TEM image of a cross-link in a converted BN aerogel. The sheets here formed a "Y" junction, wherein neighboring sheets shared one or more atomic layers. Some layers extended fully from one sheet to the next, while others overlapped by several nanometers. Such junctions were found in regions of the sample where two sheets laid atop one another. The aerogel thus appeared to be an interlaminated structure, where shared, sp$^2$-bonded layers of BN form the cross-links between the sheets.

Figure 7:
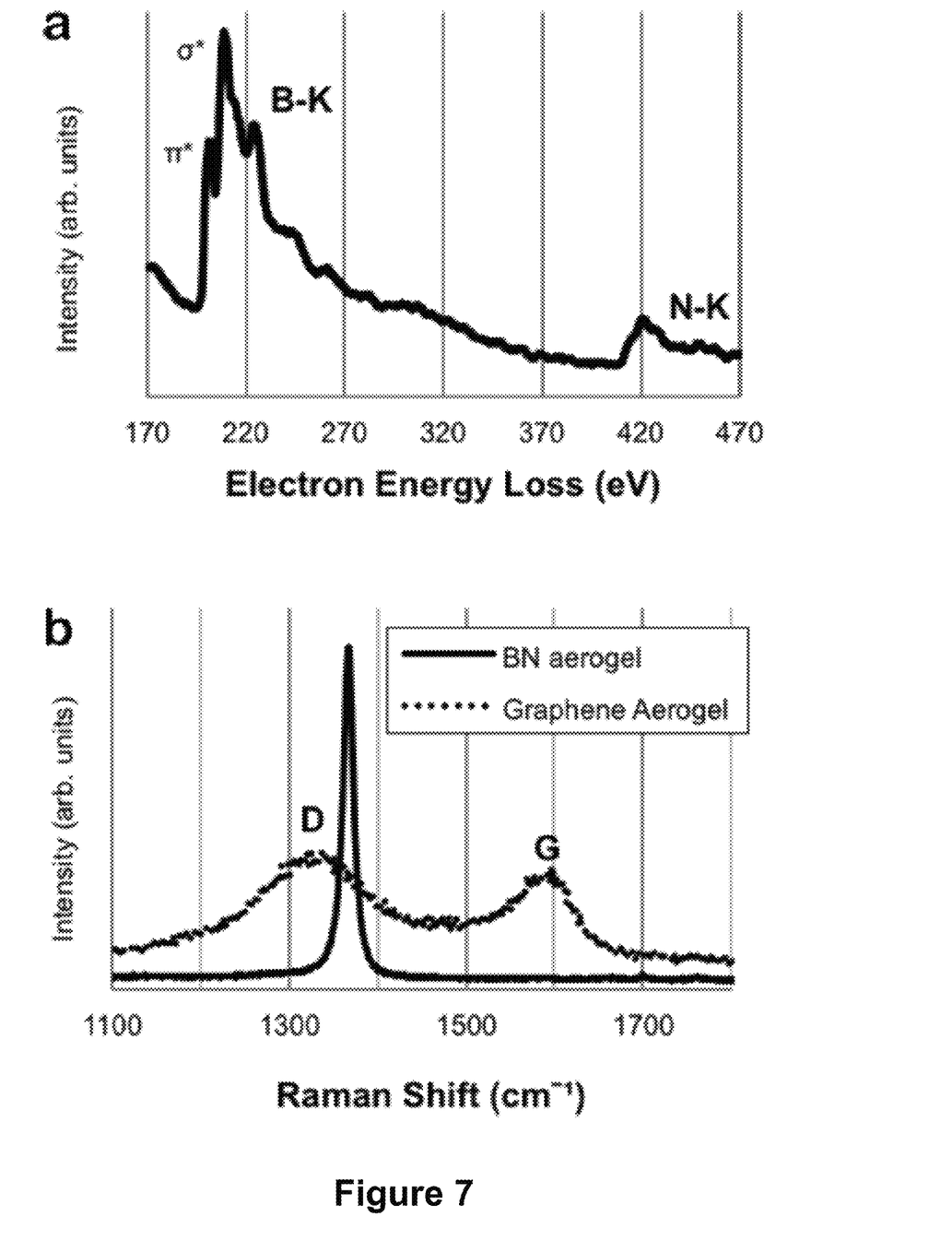

The chemical composition and bonding structure of BN aerogels was analyzed via electron energy loss spectrum (EELS) taken over a probe area of about 50 nm radius, as shown in FIG. 7a. A distinct nitrogen K edge at 401 eV, as well as the well-resolved boron peaks arising from π* and σ* states at around 188 eV, indicated a well-ordered, hexagonally bonded BN. The absence of any carbon K edge at 284 eV confirmed that the original graphene aerogel had been completely consumed in the conversion process. The boron to nitrogen atomic ratio for this sample was 0.97±0.14, while the carbon content was less than 5%.

The dramatic change in the chemical composition and crystalline order upon converting graphene aerogel to BN aerogel was also evident in the Raman spectra of the respective materials, as shown in FIG. 7b. For the graphene aerogel, a strong D peak at 1329 cm$^{-1}$ and the absence of a significant 2D signal (not shown) indicated a multilayer, disordered graphene structure, as observed previously for other graphene aerogels synthesized by a similar method. After subtraction of a background signal, the asymmetric G band was fit into two Lorentzians at 1573 cm$^{-1}$ and 1601 cm$^{-1}$ with full width at half maximum (FWHM) of 60.56 cm$^{-1}$ and 26.74 cm$^{-1}$, respectively. This peak fitting was qualitatively similar to double-peak features found in graphene nanoribbons. After conversion to BN, these peaks were entirely absent and replaced by a single peak at 1366 cm$^{-1}$, as also observed in highly crystalline samples of pyrolytic h-BN. This $E_{2g}$ peak was due to the same in-plane phonons that give rise to the G peak in graphene. There was no measurable shift in the peak, as is expected for BN sheets more than 5 atomic layers thick. The FWHM of 14 cm$^{-1}$ indicated a highly crystalline BN and the small increase in peak width from 9.1 cm$^{-1}$ was likely related to finite phonon lifetimes due to the nanoscale crystal grains within the wrinkled sheets of the aerogel. A quantitatively similar broadening of the $E_{2g}$ peak has been seen previously in BN crystallites similar in size and shape to the aerogel platelets seen in the TEM images.

The increase in crystalline order, as well as the increase in the wall thickness compared to the graphene precursor, have also been seen in the conversion of other nanostructured carbon materials, and appear to be a consequence of the specifics of the conversion reaction. The doubling of the number of layers making up the BN aerogel was corroborated by an approximate halving of the SSA; for one particular sample, the mesopore surface area (2 nm to 50 nm pore diameter) derived from nitrogen adsorption isotherms and calculated using the Brunauer-Emmett-Teller (BET) model was reduced from 1390 m$^2$/g for the graphene precursor to 675 m$^2$/g for the BN aerogel. At the same time, the mass and consequently the density tended to decrease by around 10%. While Eq. (1) would imply a mass increase, it is possible that additional mass losses are introduced through impurity oxidizers as well as the formation of cyanogens.

The mass loss and SSA reduction, coupled with the observation that the nanoscale folds in the sheets are preserved, suggests a particular mechanism for the carbothermal reduction process. Namely, it seems likely that the BN conversion process proceeds via a face-to-face reaction of two graphitic surfaces. A possible intermediate step in reaction (1) is the inclusion of boron radicals in each of two adjacent graphene lattices ($C_n$) via a partially reduced boron oxide molecule, followed by nitridation:

$$B_2O_2 + 2C_n \rightarrow 2B^*C_{n-1} + 2CO \qquad (2)$$

$$2B^*C_{n-1} + 2N_2 \rightarrow 2BN + 2C_{n-2} + C_2N_2 \qquad (3)$$

It was observed (in separate experiments) that single-walled carbon nanotubes do not tend to survive the conversion process, whereas double-walled carbon nanotube do tend to survive the conversion process, which further supports this view.

The role of water, which is always present in the conversion system that was used (i.e., a cylindrical graphite crucible) because of the hygroscopic nature of the insulation in the furnace, should also be considered. It is known, for example, that the presence of water dramatically increases the formation of cyangens in the direct nitridation of graphite.

Further studies, in particular analysis of flue gases and the role of water concentration in the reactants, will help to clarify the details of the reduction process.

Finally, it should be noted that formation of BN via carbothermal reduction is typically surface-passivated, and thus conventionally additional promoters such as various metal oxides are necessary to obtain appreciable conversion yield. This is not the case for the methods disclosed herein. The exceptionally high SSA of graphene aerogels lends itself particularly well to the conversion process, and as such, no additional promoters are necessary to take the reaction to completion.

EXAMPLE 3

CONCLUSION

Disclosed herein are embodiments of an inexpensive and non-toxic process for the conversion of a porous crystalline graphene material to a similarly structured BN material, opening possibilities in the research and development of new nanostructured BN materials. The growing number of applications for porous BN demands new methods for synthesis. The processes disclosed herein show that the meso-scale architecture, as well as the nanoscale morphology of the porous precursor materials, can be well maintained through conversion to BN.

Further details regarding some of the example embodiments disclosed herein can be found in Rousseas et al., Synthesis of Highly *Crystalline sp²*-Bonded Boron Nitride Aerogels, *ACS NANO,* 2013, 7(10):8540-8546, which is herein incorporated by reference in its entirety.

As used herein, the singular terms "a," "an," and "the" include plural referents unless the context clearly dictates otherwise. Thus, for example, reference to a marker can include multiple markers unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A composition comprising:
an aerogel comprising a three-dimensional network of covalent sp²-bonded boron nitride sheets having an ordered crystalline structure and not a substantially turbostratic crystalline structure.

2. The composition of claim 1, wherein the ordered crystalline structure includes atomic layers of hexagonal boron nitride laying on top of one another, and wherein atoms contained in a first layer are superimposed on atoms contained in a second layer.

3. The composition of claim 1, wherein atomic planes of the boron nitride have an interplanar distance of about 3.3 Angstroms.

4. The composition of claim 1, wherein the boron nitride does not have a substantially disordered crystalline structure.

5. The composition of claim 1, wherein the boron nitride has a degree of crystallinity of at least 50% by weight.

6. The composition of claim 1, wherein at least 50% of all boron nitride sheets in the aerogel are covalently bonded to one another, and wherein less than 30% of all boron nitride sheets in the aerogel are associated with other boron nitride sheets by van der Waals force only.

7. The composition of claim 1, wherein at least 70% of all boron nitride sheets in the aerogel are covalently bonded to one another, and wherein less than 10% of all boron nitride sheets in the aerogel are associated with other boron nitride sheets by van der Waals force only.

8. The composition of claim 1, wherein the aerogel comprises at least about 95 atomic percent boron nitride.

9. The composition of claim 1, wherein the aerogel has a surface area of about 350 meters squared per gram to 3000 meters squared per gram.

10. The composition of claim 1, wherein the boron nitride comprises hexagonal boron nitride.

11. The composition of claim 1, wherein the boron nitride sheets comprise about 5 atomic layers of boron nitride or less.

12. The composition of claim 1, wherein the boron nitride sheets comprise an average of about 6 atomic layers of boron nitride.

13. The composition of claim 1, wherein at least a portion of the boron nitride sheets form slit-shaped pore structures about 400 nanometers to 600 nanometers wide and about 2 microns to 4 microns long.

14. The composition of claim 1, wherein the aerogel has a white color.

15. The composition of claim 1, wherein the aerogel has a mass density of about 50 milligrams per cubic centimeter to 150 milligrams per cubic centimeter.

16. The composition of claim 1, wherein the boron nitride sheets have planar surfaces having dimensions of about 10 microns to 50 microns by about 10 microns to 50 microns.

17. The composition of claim 1, wherein pores of the aerogel have diameters of about 2 nanometers to 50 nanometers.

18. The composition of claim 1, wherein Raman spectrum of the aerogel has a single peak at 1366 $cm^{-1}$.

19. The composition of claim 1, wherein at least 70% of all boron nitride sheets in the aerogel are sp²-bonded to other boron nitride sheets.

20. The composition of claim 1, wherein the aerogel is obtained by: (a) providing boron oxide and an aerogel comprising carbon; (b) heating the boron oxide to melt the boron oxide and heating the aerogel; (c) mixing a nitrogen-containing gas with boron oxide vapor from molten boron oxide; and (d) converting at least a portion of the carbon of the aerogel to boron nitride.

* * * * *